United States Patent [19]
Germann

[11] Patent Number: 6,137,352
[45] Date of Patent: Oct. 24, 2000

[54] CIRCUIT ARRANGEMENT FOR PROTECTION OF HF-INPUT-CIRCUIT ON TELECOMMUNICATIONS DEVICES

[75] Inventor: Ivo Germann, St. Gallens, Switzerland

[73] Assignee: Huber and Suhner AG, Herisau, Switzerland

[21] Appl. No.: 08/967,360

[22] Filed: Nov. 7, 1997

[30] Foreign Application Priority Data

Jan. 27, 1997 [CH] Switzerland .............................. 0159/97

[51] Int. Cl.[7] .............................. H03K 5/00; H02H 9/04
[52] U.S. Cl. .......................... 327/601; 327/310; 327/309; 327/558; 327/552; 361/118; 361/119; 333/12; 333/23
[58] Field of Search ..................................... 327/551, 552, 327/311, 601, 306, 309, 310, 558; 361/118, 119, 56; 333/12, 23

Primary Examiner—Dinh T. Le
Attorney, Agent, or Firm—Jay H. Maioli

[57] ABSTRACT

The fine protection circuit arrangement is to reduce the remaining residual impulses on gas tube charge eliminators. This is to be achieved by means of a cascading of a gas tube charge eliminator or a λ/4 shorting stub with a fine protection circuit. The fine protection circuit connected to the gas tube circuit eliminator or λ/4 shorting stub reduces the relatively high residual voltage at the output of the gas tube charge eliminator or λ/4 shorting stub to a minimal value.

4 Claims, 2 Drawing Sheets

CIRCUIT ARRANGEMENT FOR PROTECTION OF HF-INPUT-CIRCUIT ON TELECOMMUNICATIONS DEVICES

BACKGROUND OF THE INVENTION

The present invention relates to a circuit arrangement for reduction of the remaining residual impulses on gas tube charge eliminators and λ/4 shorting stub.

Electromagnetic pulses of artificial type, such as can be produced by motors, switches, switch-mode power supply units or the like as well as of natural provenance, as from direct or indirect lightning strikes, are guided by inductive, capacitive or galvanic coupling via coaxial lines into the connected devices and can damage or even destroy the latter. It is known to protect the devices against interference voltages or lightning strike currents at their input by discharging or reflecting systems. E.g. high voltage suppressors filled with gas have become known as well as λ/4 short-circuiting lines, also called λ/4 shorting stubs in the English language. The expression EMP-Filter for electromagnetic pulses is also usual. With this kind of element these harmful currents and voltages can be reduced. There remain residual voltage peaks or high voltages, such that this kind of protection is often insufficient for sensitive HF-input-circuits of telecommunication devices. Circuit arrangements with voltage-limiting elements such as they are used for low-frequency signals and voltage circuits and control circuits cannot be used due their self-capacitance and further behaviour disadvantageous to HF-circuit arrangements.

SUMMARY OF THE INVENTION

Thus it is an object of the invention to reduce such residual voltage peaks at least to a degree that they are not harmful to sensitive devices and in doing this do not change the HF-transmission properties.

BRIEF DESCRIPTION OF THE DRAWINGS

According to the invention this is achieved according to the characteristic part of the first independent claim.

An exemplary embodiment of the invention is explained below with the aid of the drawings in which:

DETAILED DESCRIPTION OF PREFERRED EMBODIMENT

Figure 1:
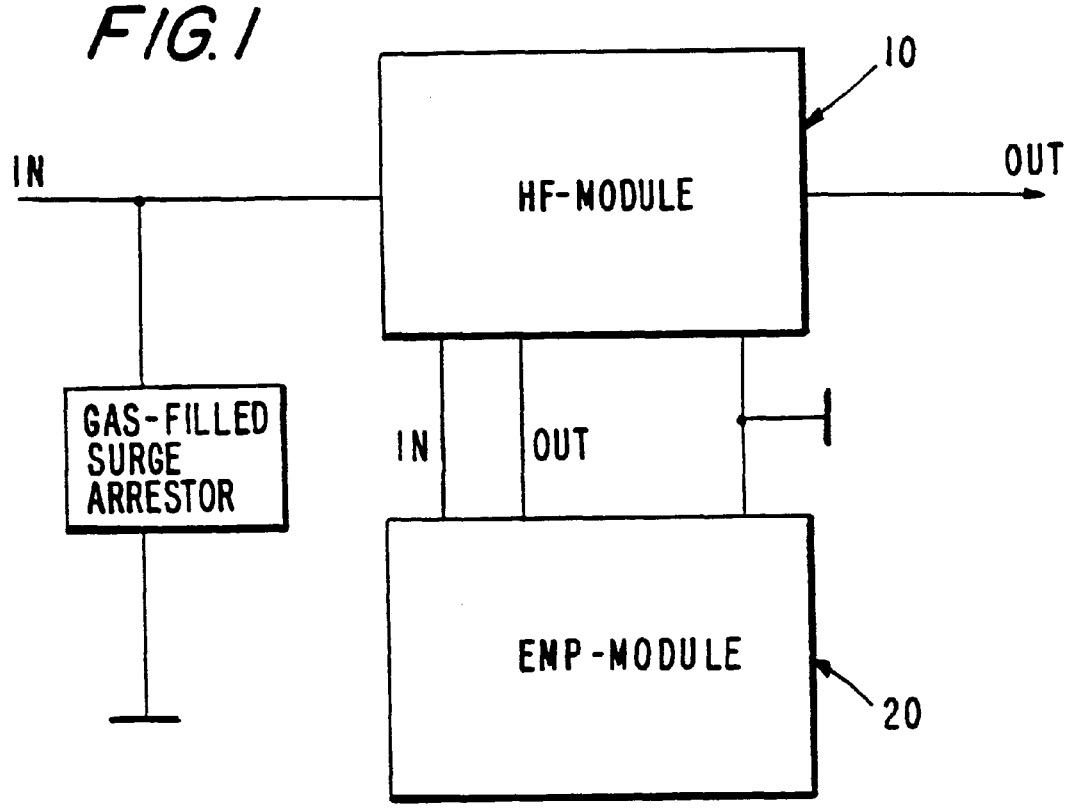
Figure 2:
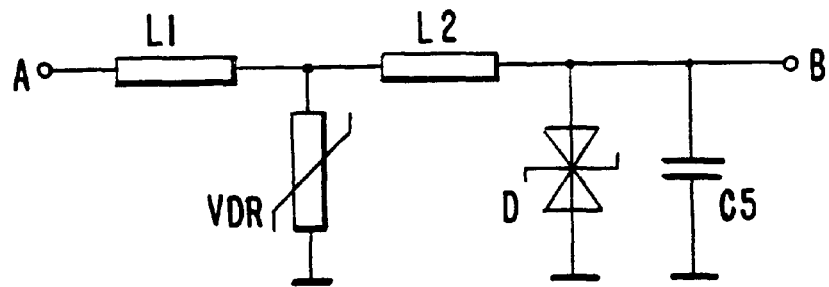
Figure 3:
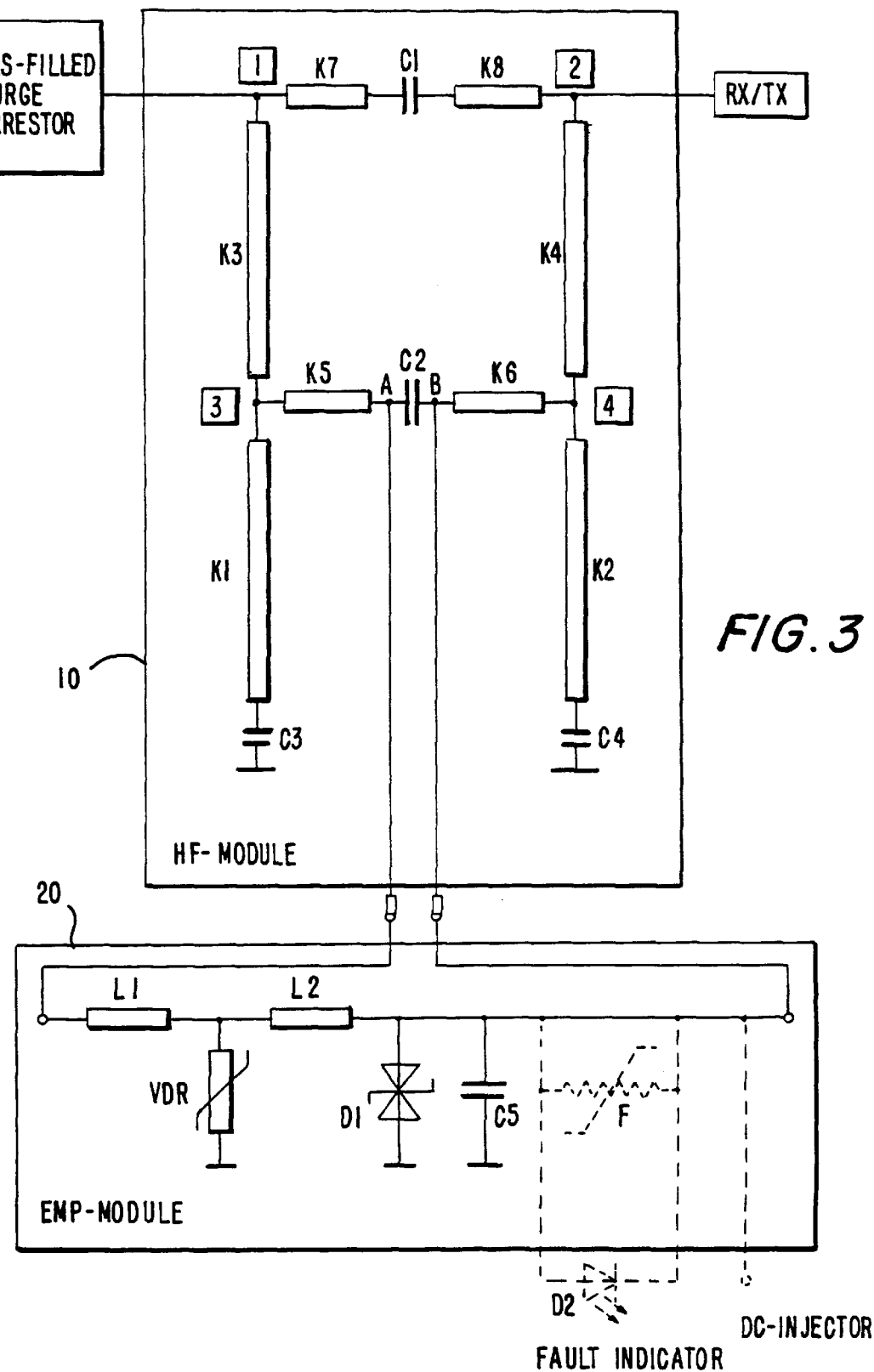

FIG. 1 shows a diagrammatic representation of the inventive circuit arrangement, FIG. 2 shows a diagram of a module for reduction of the residual impulse and FIG. 3 shows a circuit diagram of the fine protection for gas tube charge eliminator or λ/4 shorting stubs.

The fundamental concept of the inventive fine protection arrangement for gas tube containing charge eliminators or λ/4 shorting stubs consists of two modules 10,20, as shown in FIG. 1, firstly of an HF-module 10 and an EMP-module 20. The HF-module 10 is connected in the line in-between a gas tube containing charge eliminator or a λ/4 shorting stub and the fed device RX/TX. It consists of a decoupling network of known construction which must take care that the EMP-module 20 does not effect the HF-properties of the entire circuit arrangement. Thus the EMP-module 20 can be constructed from any components even components which are HF-technically disadvantageous.

The EMP-module 20 itself is responsible for the reduction of the residual pulse and comprises components such as varistors, diodes, decoupling coils as will be explained more in detail later.

The advantage of this kind of construction of module lies in the great variety of possible variants achieved with it. If the connection between the modules 10 and 20 is designed to be a plug-in connection the desired circuit arrangement can be easily set up according to need. The fine protection circuit arrangement may e.g. be used as protection against ESD, surge or burst, e.g. for testing purposes, even without gas tube charge eliminator or λ/4 shorting stub.

FIG. 2 shows a circuit diagram of an EMP-module 20. This module 20 is for the reduction of short high voltages and discharge of overcurrent towards earth. As shown in the figure two coils L1 and L2 are connected in line in-between two connection points A and B.

Between the two coils L1, L2 a connection point for a varistor VDR is provided which is connected to earth. Between the second coil L2 and connection point B a protective diode D and a capacitor C5 are connected in line, the second connection points of which are also connected to earth.

Varistor VDR and protective diode D also serve for the limitation of the voltages acting for a short time and thus are the second or third protective step after the gas tube. In order for these protective steps to respond in the temporally correct order the decoupling inductivities L1 and L2 are separated from each other.

The circuit arrangement according to FIG. 3 shows an assembly of HF-module 10 and EMP-module 20. The HF-module is constructed such that the HF-properties are independent of the assembly and of the circuit arrangement of the EMP-module connected to it.

This circuit arrangement shows a quadrupol in which two opposing branches each consist of a serial connection of two lines K5, K6, K7, K8 and a capacity C1, C2 connected in-between of which one branch K7, C1, K8 lies in the HF-line and the other branch K5, C2, K6 is connected to a serial connection of a line K1, K2 and a capacity C3, C4 with mass. The ends 1, 2, 3, 4 of the two serial circuits K5, C2, K6, K7, C1, K8 are connected to each other by one line K3, K4 each.

The capacitor C3 or C4 respectively is transformed over a line K1 or K2 respectively to a short circuit at node 3 or node 4 respectively. Thus line K3 or K4 respectively has on its end a parallel connection of the impedance of the EMP-module 20 and of the impedance Z=0Ω. Thus it is achieved that independently of the impedance of the EMP-module a total impedance Z=∞Ω is formed at nodes 3 or 4 respectively.

The total impedance Z=0Ω is transformed over line K3 or K4 respectively to an impedance of theoretically Z=∞Ω at node 1 or node 2 respectively.

Thus the network of the HF-module 10 together with EMP-module 20 behaves identically to a cascading of two 4-resonators. What is substantial about this is that this behaviour is not dependant on the size of the impedance of the EMP-module.

In the description of the HF-module 10 it was shown that the impedance of the EMP-module 20 does not affect the entire circuit. Thus the EMP-module 20 can be connected in different manners to meet the most various requests.

This means that a direct current could he fed into the HF-line over a connection point on the EMP-module 20, the kind of current which is also required for the feeding of active antennae. The protection of the components against faulty operational voltages and especially against short circuiting could also be achieved with a fuse F at the end of the circuit of EMP-module 20. This kind of fuse can be a safety fuse or a resetable PCT-fuse or multifuse. It would also be thinkable to monitor the components regarding faultless function with light emitting diodes D2.

I claim:

1. A circuit for reducing residual impulses remaining on a gas tube charge eliminator and connected between said gas tube charge eliminator and a load, said circuit being a passive circuit comprising:

an HF circuit for providing decoupling between said gas tube charge eliminator and said load;

two coils connected in series between an input and an output of said decoupling circuit;

a varistor connected between a common connection of said two coils and ground;

a voltage limiting diode; and a capacitor connected in parallel to said voltage limiting diode, wherein said parallel connection of said capacitor and said voltage limiting diode is connected between said output of said circuit and said ground.

2. The circuit according to claim 1, wherein said decoupling circuit comprises a $\lambda/4$ shorting stub connected between said input of said decoupling circuit and said ground.

3. The circuit according to claim 2, wherein said HF-circuit is a quadrupol in which each of first opposite branches is formed of a serial circuit of two lines with a capacitor connected therebetween, and each of second opposite branches is formed of one line, wherein one of said first opposite branches lies in an HF-line and the other of said first opposite branches is connected in said serial circuit formed of two lines and two capacitors, the serial circuit being connected at each end to said ground.

4. The circuit according to claim 3, wherein said circuit is connected in parallel to said capacitor of said other one of said two branches of said quadrupol.

* * * * *